United States Patent
Ishikawa et al.

(10) Patent No.: US 12,170,362 B2
(45) Date of Patent: *Dec. 17, 2024

(54) NEGATIVE ELECTRODE FOR NONAQUEOUS ELECTROLYTE SECONDARY BATTERY AND NONAQUEOUS ELECTROLYTE SECONDARY BATTERY

(71) Applicants: Panasonic Corporation, Kadoma (JP); SANYO Electric Co., Ltd., Daito (JP)

(72) Inventors: Kaori Ishikawa, Hyogo (JP); Yuta Matsuo, Hyogo (JP); Daisuke Ito, Hyogo (JP); Kouhei Tsuzuki, Hyogo (JP)

(73) Assignees: PANASONIC HOLDINGS CORPORATION, Osaka (JP); PANASONIC ENERGY CO., LTD., Osaka (JP)

(*) Notice: Subject to any disclaimer, the term of this patent is extended or adjusted under 35 U.S.C. 154(b) by 566 days.

This patent is subject to a terminal disclaimer.

(21) Appl. No.: 16/640,216

(22) PCT Filed: Dec. 14, 2018

(86) PCT No.: PCT/JP2018/046008
§ 371 (c)(1),
(2) Date: Feb. 19, 2020

(87) PCT Pub. No.: WO2019/131195
PCT Pub. Date: Jul. 4, 2019

(65) Prior Publication Data
US 2020/0365878 A1    Nov. 19, 2020

(30) Foreign Application Priority Data
Dec. 27, 2017  (JP) .................. 2017-252477

(51) Int. Cl.
H01M 4/36    (2006.01)
H01M 4/02    (2006.01)
(Continued)

(52) U.S. Cl.
CPC .......... H01M 4/364 (2013.01); H01M 4/133 (2013.01); H01M 4/134 (2013.01); H01M 4/366 (2013.01);
(Continued)

(58) Field of Classification Search
CPC ...... H01M 4/133; H01M 4/134; H01M 4/366; H01M 4/02–661; H01M 10/0525; H01M 2004/021; H01M 2004/027
See application file for complete search history.

(56) References Cited

U.S. PATENT DOCUMENTS

2008/0113271 A1    5/2008  Ueda et al.
2011/0183218 A1*   7/2011  Odani ............... H01M 10/4235
                                                    429/342
(Continued)

FOREIGN PATENT DOCUMENTS

CN    110313089 A    10/2019
JP    2000-348730 A   12/2000
(Continued)

OTHER PUBLICATIONS

EPO English machine translation of WO 2018179817 originally published to Ishikawa Kaori on Oct. 4, 2018 (Year: 2018).*
(Continued)

Primary Examiner — Anca Eoff
Assistant Examiner — Niara Trant
(74) Attorney, Agent, or Firm — WHDA, LLP

(57) ABSTRACT

A negative electrode for a nonaqueous electrolyte with a negative electrode mixture layer that includes a first layer and a second layer. The first layer is formed on the negative electrode current collector and includes a negative electrode active material and a first binding agent. The negative electrode active material in the first layer includes a carbon material A and a Si-containing compound. The first binding agent includes polyacrylic acid or a salt thereof. The second layer is formed on the first layer and includes a negative electrode active material and a second binding agent. The negative electrode active material in the second layer includes a carbon material B. The carbon material B has a
(Continued)

tap density higher than a tap density of the carbon material A. A packing density of the second layer is lower than a packing density of the first layer.

9 Claims, 1 Drawing Sheet

(51) Int. Cl.
    *H01M 4/133*     (2010.01)
    *H01M 4/134*     (2010.01)
    *H01M 4/66*     (2006.01)
    *H01M 10/0525*     (2010.01)

(52) U.S. Cl.
    CPC ....... *H01M 4/661* (2013.01); *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2012/0114979 A1* | 5/2012 | Kim | H01M 10/0431 |
| | | | 429/7 |
| 2016/0190552 A1 | 6/2016 | Murata et al. | |
| 2016/0204431 A1* | 7/2016 | Sawa | H01M 4/366 |
| | | | 429/218.1 |
| 2018/0062158 A1* | 3/2018 | Kim | H01M 4/364 |
| 2018/0097255 A1 | 4/2018 | Jung et al. | |
| 2018/0358610 A1 | 12/2018 | Shimanuki et al. | |
| 2021/0104750 A1 | 4/2021 | Ito et al. | |

FOREIGN PATENT DOCUMENTS

| | | | |
|---|---|---|---|
| JP | 2006-59704 A | | 3/2006 |
| JP | 2010165471 A | * | 7/2010 |
| JP | 2010251126 A | * | 11/2010 |
| JP | 2013-149387 A | | 8/2013 |
| WO | 2006/129415 A1 | | 12/2006 |
| WO | 2015/098050 A1 | | 7/2015 |
| WO | 2016/175560 A1 | | 11/2016 |
| WO | 2017/094712 A1 | | 6/2017 |
| WO | 2018/179817 A1 | | 10/2018 |

OTHER PUBLICATIONS

EPO English machine translation of JP 2010165471, originally published to Jinno Maruo on Jul. 29, 2010 (Year: 2010).*
EPO English machine translation of JP 2010251126, originally published to Fuse Turo on Nov. 4, 2010 (Year: 2010).*
International Search Report dated Mar. 12, 2019, issued in counterpart International Application No. PCT/JP2018/046008. (2 pages).
Extended European Search Report dated Feb. 1, 2021, issued in counterpart EP application No. 18893662.9 (75 pages).
English Translation of Chinese Search Report dated Jul. 22, 2022, issued in counterpart CN application No. 201880051288.1. (2 pages).

* cited by examiner

NEGATIVE ELECTRODE FOR NONAQUEOUS ELECTROLYTE SECONDARY BATTERY AND NONAQUEOUS ELECTROLYTE SECONDARY BATTERY

TECHNICAL FIELD

The present invention relates to a technology for a negative electrode for a nonaqueous electrolyte secondary battery and a technology for a nonaqueous electrolyte secondary battery.

BACKGROUND ART

It is known that more lithium ions can be stored in Si-containing compounds, such as silicon oxide represented by $SiO_x$, than in carbon-based active materials, such as graphite, per unit volume.

For example, PTL 1 discloses a nonaqueous electrolyte secondary battery that includes silicon oxide as a negative electrode active material and in which polyacrylic acid is used as a binding agent for a negative electrode mixture layer. Furthermore, PTL 1 also discloses that graphite and a Si-containing compound are used in combination.

CITATION LIST

Patent Literature

PTL 1: Japanese Published Unexamined Patent Application No. 2000-348730

SUMMARY OF INVENTION

In negative electrodes in which a negative electrode active material including a Si-containing compound is used, one problem is the degradation of charge-discharge cycle characteristics. A Si-containing compound undergoes a significant volume change in association with charging and discharging, and as a result, the degree of contact between the negative electrode active material particles decreases or the state of contact between the particles is lost. It is believed that this results in an increase in the number of negative electrode active material particles that are isolated from the conductive paths in the negative electrode mixture layer, and, consequently, charge-discharge cycle characteristics are degraded. To inhibit an increase in the number of such isolated negative electrode active material particles, it may be conceivable to increase the content of a binding agent. In this case, however, the resistance of the negative electrode mixture layer increases, for example, and as a result, the input characteristics of a nonaqueous electrolyte secondary battery may be degraded.

Accordingly, an object of the present disclosure is to provide a negative electrode for a nonaqueous electrolyte secondary battery, the negative electrode being designed to inhibit degradation of the charge-discharge cycle characteristics of a nonaqueous electrolyte secondary battery and also improve the input characteristics thereof, in a case where a Si-containing compound is included as a negative electrode active material.

According to an aspect of the present disclosure, a negative electrode for a nonaqueous electrolyte secondary battery includes a negative electrode current collector and a negative electrode mixture layer formed on the negative electrode current collector. The negative electrode mixture layer includes a first layer and a second layer. The first layer is formed on the negative electrode current collector and includes a negative electrode active material and a first binding agent. The negative electrode active material in the first layer includes a carbon material A and a Si-containing compound. The first binding agent includes polyacrylic acid or a salt thereof. The second layer is formed on the first layer and includes a negative electrode active material and a second binding agent. The negative electrode active material in the second layer includes a carbon material B. The carbon material B has a tap density higher than a tap density of the carbon material A. A mass of the first layer relative to a mass of the negative electrode mixture layer is 50 mass % or greater and less than 90 mass %. A mass of the second layer relative to the mass of the negative electrode mixture layer is greater than 10 mass % and 50 mass % or less. A packing density of the second layer is lower than a packing density of the first layer.

According to an aspect of the present disclosure, a nonaqueous electrolyte secondary battery includes the negative electrode for a nonaqueous electrolyte secondary battery; a positive electrode; and a nonaqueous electrolyte.

With an aspect of the present disclosure, degradation of the charge-discharge cycle characteristics of a nonaqueous electrolyte secondary battery is inhibited, and also, the input characteristics thereof are improved.

DESCRIPTION OF EMBODIMENTS

Figure 1:
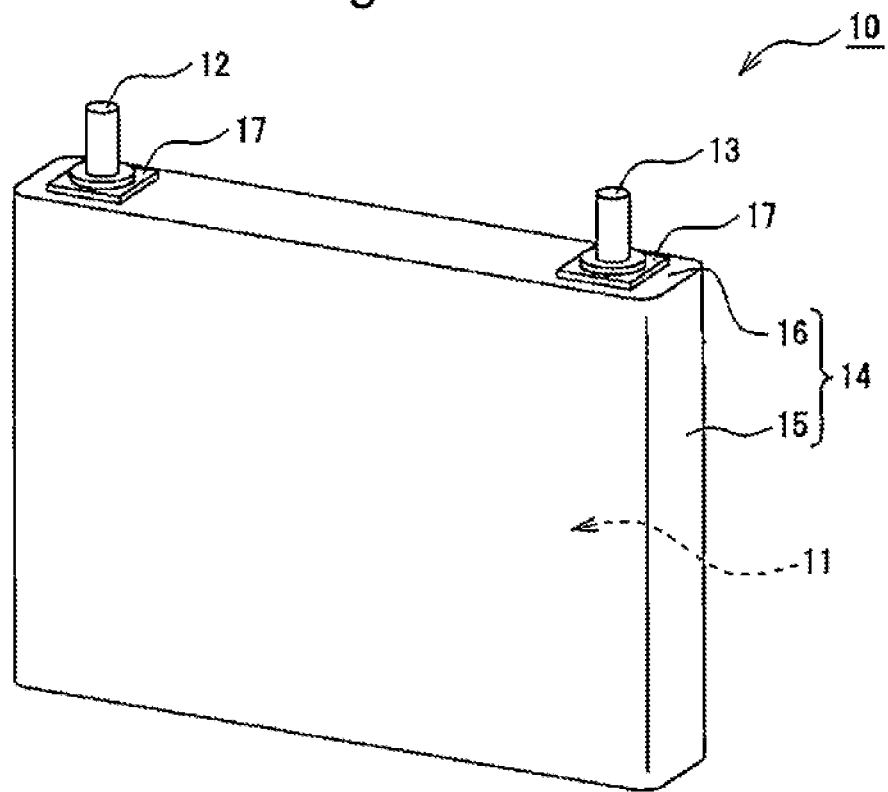
FIG. 1 is a perspective view of a nonaqueous electrolyte secondary battery, which is an example of an embodiment.

According to an aspect of the present disclosure, a negative electrode for a nonaqueous electrolyte secondary battery includes a negative electrode current collector and a negative electrode mixture layer formed on the negative electrode current collector. The negative electrode mixture layer includes a first layer and a second layer. The first layer is formed on the negative electrode current collector and includes a negative electrode active material and a first binding agent. The negative electrode active material in the first layer includes a carbon material A and a Si-containing compound. The first binding agent includes polyacrylic acid or a salt thereof. The second layer is formed on the first layer and includes a negative electrode active material and a second binding agent. The negative electrode active material in the second layer includes a carbon material B. The carbon material B has a tap density higher than a tap density of the carbon material A. A mass of the first layer relative to a mass of the negative electrode mixture layer is 50 mass % or greater and less than 90 mass %. A mass of the second layer relative to the mass of the negative electrode mixture layer is greater than 10 mass % and 50 mass % or less. A packing density of the second layer is lower than a packing density of the first layer.

The carbon material B, which is included in the second layer and has a high tap density, is a material that enables lithium ions to be intercalated into the carbon material at a high rate and, therefore, has high ion acceptance with respect to, for example, lithium ions, compared with the carbon material A, which is included in the first layer and has a low tap density. Furthermore, the second layer, which has a low packing density, has high wetting characteristics with respect to electrolyte solutions that are nonaqueous electrolytes and, therefore, has a large number of ion conductive paths (lithium ion conductive paths), compared with the first layer, which has a high packing density. The second layer, as described, is formed on the first layer, which is formed on the negative electrode current collector. This configuration improves the input characteristics of a nonaqueous electrolyte secondary battery. Furthermore, the polyacrylic acid or salt thereof included in the first layer strongly binds particles of the negative electrode active material (the Si-containing compound and the carbon material A) together. Hence, even in a case where the Si-containing compound undergoes a significant volume change in association with charging and discharging, an increase in the number of negative electrode active material particles that are isolated from conductive paths in the first layer is inhibited. Accordingly, degradation of the charge-discharge cycle characteristics of a nonaqueous electrolyte secondary battery is inhibited.

Note that in this specification, the phrase "a value (1) to a value (2)" means a value (1) or greater and a value (2) or less.

The following describes an example of a nonaqueous electrolyte secondary battery, in which a positive electrode active material for a nonaqueous electrolyte secondary battery according to an aspect of the present disclosure is used.

FIG. 1 is a perspective view of a nonaqueous electrolyte secondary battery, which is an example of an embodiment. A nonaqueous electrolyte secondary battery 10, illustrated in FIG. 1, is a prismatic battery; however, nonaqueous electrolyte secondary batteries of the present disclosure are not limited to this configuration and may be, for example, a cylindrical battery, a laminated battery, or the like.

The nonaqueous electrolyte secondary battery 10 illustrated in FIG. 1 includes an electrode assembly 11, a nonaqueous electrolyte, and a battery case 14, which houses therein the electrode assembly 11 and the nonaqueous electrolyte. The electrode assembly 11 includes a positive electrode, a negative electrode, and a separator. The electrode assembly 11 is an electrode assembly having a stacked configuration in which positive and negative electrodes are alternately stacked with a separator disposed therebetween. However, the electrode assembly is not limited to this configuration and may be, for example, an electrode assembly having a wound configuration in which positive and negative electrodes are wound together with a separator disposed therebetween.

The battery case 14 includes a case body 15, which is generally box-shaped, a sealing member 16, which closes an opening of the case body 15, a positive electrode terminal 12, which is electrically connected to the positive electrode, and a negative electrode terminal 13, which is electrically connected to the negative electrode. The case body 15 and the sealing member 16 are formed of, for example, a metal material that primarily includes aluminum. The positive electrode terminal 12 and the negative electrode terminal 13 are secured to the sealing member 16 with an insulating member 17 disposed therebetween. Note that, typically, a gas outlet feature (not illustrated) is provided in the sealing member 16. The form of the battery case 14 is not limited to the form described above, and a form known in the art may be employed.

The following describes in detail the positive electrode, the negative electrode, the nonaqueous electrolyte, and the separator that are used in the nonaqueous electrolyte secondary battery that is an example of an embodiment.
<Positive Electrode>
The positive electrode includes a positive electrode current collector and a positive electrode mixture layer formed on the positive electrode current collector. The positive electrode current collector may be made of a metal that is stable in the potential range of the positive electrode. The metal may be aluminum, for example, and may be in the form of a foil, a film in which the metal is disposed in a surface layer, or the like. The positive electrode mixture layer includes, for example, a positive electrode active material, a binding agent, a conductive material, and the like. The positive electrode mixture layer is formed, for example, on both sides of the positive electrode current collector. The positive electrode may be obtained in the following manner, for example. A positive electrode mixture slurry including a positive electrode active material, a binding agent, a conductive material, and the like is applied onto the positive electrode current collector, and then the applied layer is dried to form a positive electrode active material layer on the positive electrode current collector. The positive electrode active material layer is then rolled.

The positive electrode active material includes a lithium transition metal oxide, for example. A metal element included in the lithium transition metal oxide is at least one selected from, for example, magnesium (Mg), aluminum (Al), calcium (Ca), scandium (Sc), titanium (Ti), vanadium (V), chromium (Cr), manganese (Mn), iron (Fe), cobalt (Co), nickel (Ni), copper (Cu), zinc (Zn), gallium (Ga), germanium (Ge), yttrium (Y), zirconium (Zr), tin (Sn), antimony (Sb), tungsten (W), lead (Pb), and bismuth (Bi). Among these, it is preferable to include at least one selected from Co, Ni, Mn, and Al.

Examples of the conductive material included in the positive electrode mixture layer include carbon materials, such as carbon black (CB), acetylene black (AB), Ketjen black, and graphite. These may be used alone or in a combination of two or more.

Figure 2:
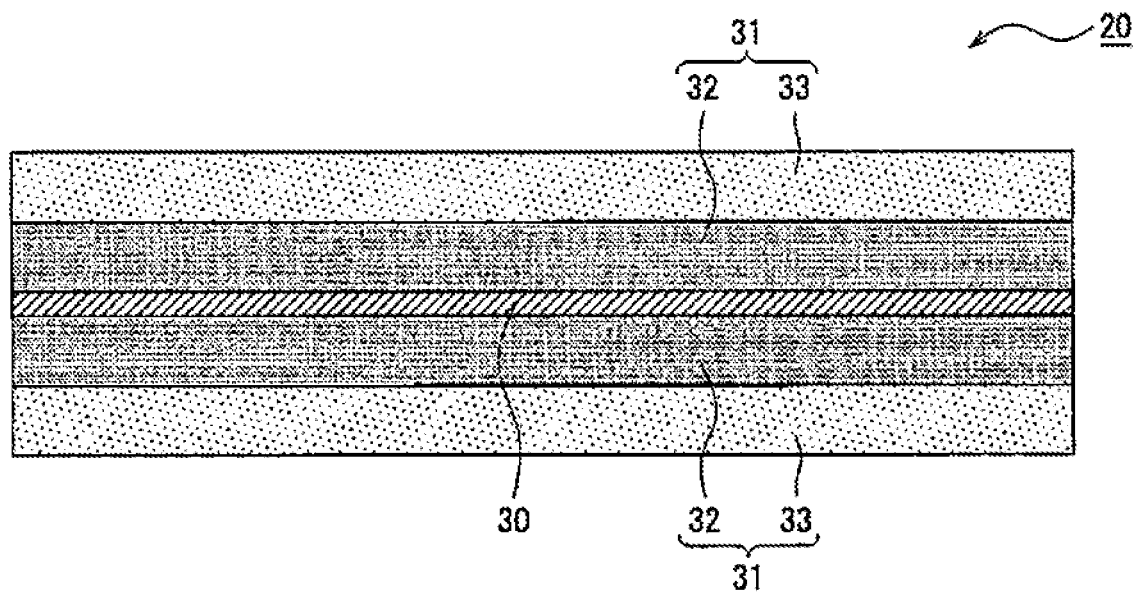
FIG. 2 is a sectional view of a negative electrode, which is an example of an embodiment.

Examples of the binding agent included in the positive electrode mixture layer include fluororesins, such as polytetrafluoroethylene (PTFE) and polyvinylidene fluoride (PVdF), polyacrylonitrile (PAN), polyimide-based resins, acrylic-based resins, and polyolefin-based resins. These may be used alone or in a combination of two or more.
<Negative Electrode>
FIG. 2 is a sectional view of a negative electrode, which is an example of an embodiment. As illustrated in FIG. 2, a negative electrode 20 includes a negative electrode current collector 30 and a negative electrode mixture layer 31, which is formed on the negative electrode current collector 30. The negative electrode current collector 30 may be made of a metal that is stable in the potential range of the negative electrode. The metal may be copper, for example, and may be in the form of a foil, a film in which the metal is disposed in a surface layer, or the like. The negative electrode mixture layer 31 is formed, for example, on both sides of the negative electrode current collector 30.

The negative electrode mixture layer 31 has a two-layer structure that includes a first layer 32, which is formed on the negative electrode current collector 30, and a second layer 33, which is formed on the first layer 32. The first layer 32 includes a negative electrode active material and a first binding agent. The negative electrode active material in the first layer includes a carbon material A and a Si-containing compound. The first binding agent includes polyacrylic acid (PAA) or a salt thereof. The second layer 33 includes a negative electrode active material and a second binding agent. The negative electrode active material in the second layer includes a carbon material B.

A mass of the first layer 32 relative to a mass of the negative electrode mixture layer 31 is 50 mass % or greater and less than 90 mass % and is preferably 50 mass % to 70 mass %. A mass of the second layer 33 relative to the mass of the negative electrode mixture layer 31 is greater than 10 mass % and 50 mass % or less and is preferably 30 mass % to 50 mass %. When the mass of the first layer 32 relative to the mass of negative electrode mixture layer 31 is 90 mass % or greater, and the mass of the second layer 33 relative to the mass of the negative electrode mixture layer 31 is 10 mass % or less, the proportion of the second layer 33, which contributes to input characteristics, is small. Thus, the input characteristics of a nonaqueous electrolyte secondary battery are degraded compared with cases other than the cases of the above-mentioned ranges. Furthermore, when the mass of the first layer 32 relative to the mass of the negative electrode mixture layer 31 is less than 50 mass %, and the mass of the second layer 33 relative to the mass of the negative electrode mixture layer 31 is greater than 50 mass %, the proportion of the first layer 32 is small (that is, the amount of the Si-containing compound is reduced). Thus, it is difficult to achieve an increase in battery capacity compared with cases other than the cases of the above-mentioned ranges.

It is preferable that a thickness of the negative electrode mixture layer 31 be, for example, 30 μm to 100 μm, on one side of the negative electrode current collector 30. More preferably, the thickness is 50 μm to 80 μm.

It is preferable that a packing density of the negative electrode mixture layer 31 be greater than or equal to 1.65 g/cm$^3$, from the standpoint of, for example, improving battery capacity. More preferably, the packing density is within a range of 1.65 g/cm$^3$ to 1.75 g/cm$^3$.

It is sufficient that a packing density of the second layer 33 be lower than a packing density of the first layer 32, in terms of improving the input characteristics of a nonaqueous electrolyte secondary battery. It is preferable, however, that the packing density of the second layer 33 be within a range of, for example, 1.40 to 1.55 g/cm$^3$. It is preferable that the packing density of the first layer 32 be within a range of, for example, 1.70 to 1.95 g/cm$^3$, from the standpoint of improving the capacity of a nonaqueous electrolyte secondary battery and inhibiting degradation of the cycle characteristics thereof.

Examples of the carbon material A included in the first layer 32 and the carbon material B included in the second layer 33 include graphite and amorphous carbon. Among these, graphite is preferable. Examples of the graphite include natural graphite, such as flake graphite, and artificial graphite, such as massive artificial graphite (MAG) and graphitized mesophase carbon microbeads (MCMB). Furthermore, the graphite may be a composite in which, for example, graphite is coated with amorphous carbon.

The carbon material A included in the first layer 32 and the carbon material B included in the second layer 33 may be an identical material or different materials provided that the tap density of the carbon material B is greater than the tap density of the carbon material A, as will be described later. It is preferable that the carbon material A included in the first layer 32 be a carbon material that can mitigate volume changes in the Si-containing compound. It is preferable that the second layer 33 be a carbon material that has increased ion acceptance with respect to, for example, lithium ions; such a carbon material may be obtained by, for example, forming a composite with amorphous carbon that has a high lithium ion intercalation and deintercalation rate. The carbon material A and the carbon material B may each be one material used alone or two or more materials used in combination. For example, two or more materials, such as flake graphite and massive artificial graphite, may be used in combination as the carbon material A, and one material, such as graphite with surfaces of the particles coated with amorphous carbon, may be used alone as the carbon material B.

The tap density of the carbon material B included in the second layer 33 is higher than the tap density of the carbon material A included in the first layer 32. This is to improve the input characteristics of a nonaqueous electrolyte secondary battery. For example, the tap density of the carbon material B is preferably greater than or equal to 1.00 g/cm$^3$ and preferably within a range of 1.00 g/cm$^3$ to 1.25 g/cm$^3$. Furthermore, a material of the carbon material B is preferably graphite. When the tap density of the carbon material B included in the second layer 33 is within any of the above-mentioned ranges, ion acceptance with respect to, for example, lithium ions may be enhanced, which may result in further improved input characteristics of a nonaqueous electrolyte secondary battery, compared with cases other than the cases of the above-mentioned ranges. It is sufficient that the tap density of the carbon material A included in the first layer 32 be lower than the tap density of the carbon material B included in the second layer 33. However, for example, the tap density of the carbon material A is preferably within a range of 0.85 g/cm$^3$ to 1.00 g/cm$^3$ and more preferably within a range of 0.89 to 0.95. Furthermore, a material of the carbon material A is preferably graphite. When the tap density of the carbon material B included in the first layer 32 is within any of the above-mentioned ranges, volume changes in the Si-containing compound may be mitigated, which may result in further inhibited degradation of the charge-discharge cycle characteristics of a nonaqueous electrolyte secondary battery, compared with cases other than the cases of the above-mentioned ranges. The tap density of the carbon materials is determined as a bulk density obtained after sample powder contained in a vessel was tapped 250 times, in accordance with the method specified in JIS Z-2504.

It is preferable that a BET specific surface area of the carbon material B included in the second layer 33 be higher than a BET specific surface area of the carbon material A included in the first layer 32, from the standpoint of, for example, improving the input characteristics of a nonaqueous electrolyte secondary battery. For example, the BET specific surface area of the carbon material B is preferably within a range of 4.0 m$^2$/g to 8.0 m$^2$/g and more preferably within a range of 4.2 to 7.0 m$^2$/g. When the BET specific surface area of the carbon material B included in the second layer 33 is within any of the above-mentioned ranges, ion acceptance with respect to, for example, lithium ions may be enhanced, which may result in further improved input characteristics of a nonaqueous electrolyte secondary battery, compared with cases other than the cases of the above-mentioned ranges. The BET specific surface area of the carbon material A included in the first layer 32 is preferably lower than the BET specific surface area of the carbon material B included in the second layer 33 and is preferably, for example, within a range of 0.9 m$^2$/g to 4.5 m$^2$/g. When the BET specific surface area of the carbon material A included in the first layer 32 is within the above-mentioned range, decreases in charge-discharge efficiency and capacity retention rate due to a side reaction with the electrolyte solution during charging and discharging may be likely inhibited compared with cases other than the cases of the above-mentioned range. The BET specific surface area is measured in accordance with the BET method (nitrogen adsorption method) described in JIS R1626.

Typically, the carbon material A included in the first layer 32 and the carbon material B included in the second layer 33 are secondary particles, that is, aggregates of multiple primary particles. The average particle diameter of secondary particles of the carbon material A and the carbon material B is not particularly limited and is, for example, 1 μm to 30 μm. The average particle diameter of secondary particles is a volume average particle diameter (Dv50), which corresponds to a volume integrated value that equals 50% in a particle size distribution measured using the laser diffraction light scattering method.

The Si-containing compound included in the first layer 32 is not particularly limited provided that the compound contains Si. Preferably, the Si-containing compound is silicon oxide represented by $SiO_x$ ($0.5 \leq x \leq 1.5$). One Si-containing compound may be used alone, or two or more Si-containing compounds may be used in combination. It is preferable that the particles of the silicon oxide, such as $SiO_x$, have, on surfaces, a conductive coating including a material having a higher conductivity than the silicon oxide. The average particle diameter (Dv50) of the silicon oxide, such as $SiO_x$, is, for example, within a range of 1 μm to 15 μm.

For example, the $SiO_x$ has a structure in which Si is dispersed in an amorphous $SiO_2$ matrix. Furthermore, the $SiO_x$ may contain lithium silicate (e.g., lithium silicate represented by $Li_{2z}SiO_{(2+z)}$ ($0<z<2$)) in the particles or may have a structure in which Si is dispersed in a lithium silicate phase.

It is preferable that the conductive coating be a carbon coating. The carbon coating is in an amount within a range of, for example, 0.5 mass % to 10 mass % relative to a mass of the $SiO_x$ particles. Examples of methods for forming the carbon coating include the following: a method in which coal tar or the like is mixed with $SiO_x$ particles, and the mixture is heat-treated; and a chemical vapor deposition method (CVD method) using a hydrocarbon gas or the like. Alternatively, the carbon coating may be formed by adhering a binder, such as carbon black or Ketjen black, to surfaces of the $SiO_x$ particles.

It is preferable that a mass ratio between the carbon material A and the Si-containing compound, which are included in the first layer 32, be within a range of, for example, 95:5 to 70:30, from the standpoint of, for example, mitigating, via the carbon material A, volume changes in the Si-containing compound to inhibit degradation of the charge-discharge cycle characteristics of a nonaqueous electrolyte secondary battery. More preferably, the range is 95:5 to 80:20.

It is sufficient that the first binding agent included in the first layer 32 contain PAA or a salt thereof (e.g., a salt, such as a lithium salt, a sodium salt, a potassium salt, or an ammonium salt, a partially neutralized salt, or the like). It is preferable, however, that an additional binding agent be included. Examples of the additional binding agent include carboxymethyl cellulose (CMC) and salts thereof, styrene-butadiene copolymers (SBR), polyvinyl alcohol (PVA), polyethylene oxide (PEO), and derivatives of the foregoing compounds.

Examples of the second binding agent included in the second layer 33 include CMC and salts thereof, SBR, PVA, PEO, and derivatives of the foregoing compounds. The second layer 33 may contain PAA or a salt thereof. It is preferable, however, that the second layer 33 contain substantially no PAA or salt thereof, from the standpoint of improving the input characteristics of a nonaqueous electrolyte secondary battery.

With regard to contents of the first binding agent included in the first layer 32 and the second binding agent included in the second layer 33, it is preferable that the content of the first binding agent included in the first layer 32 be higher than the content of the second binding agent included in the second layer 33, from the standpoint of, for example, inhibiting degradation of the charge-discharge cycle characteristics of a nonaqueous electrolyte secondary battery and improving the input characteristics of a nonaqueous electrolyte secondary battery.

The content of the first binding agent included in the first layer 32 is preferably, for example, within a range of 0.5 mass % to 10 mass % and more preferably within a range of 1 mass % to 5 mass %, relative to a mass of the first layer 32. The content of the PAA or salt thereof in the first binding agent is preferably, for example, greater than or equal to 20 mass % and more preferably greater than or equal to 30 mass %, relative to a mass of the first binding agent. When the content of the PAA or salt thereof in the first binding agent is greater than or equal to 20 mass %, the amount of the negative electrode active material that is isolated from the conductive paths in the first layer 32 may be reduced, and thus degradation of charge-discharge cycle characteristics may be more likely inhibited than in cases in which the content is less than 20 mass %.

The content of the second binding agent included in the second layer 33 is preferably, for example, within a range of 0.5 mass % to 10 mass % and more preferably within a range of 1 mass % to 5 mass %, relative to a mass of the second layer 33. Note that it is preferable that the second binding agent contain substantially no PAA or salt thereof as mentioned above. For example, it is preferable that PAA or a salt thereof be present in an amount less than 0.1 mass % relative to the mass of the second binding agent.

The negative electrode active material included in the second layer 33 may contain a Si-containing compound as mentioned above in addition to the carbon material B mentioned above. However, from the standpoint of improving the input characteristics of a nonaqueous electrolyte secondary battery, it is preferable that the negative electrode active material contain the carbon material B exclusively and contain substantially no Si-containing compound. For example, it is preferable that a content of the Si-containing compound in the second layer 33 be less than 0.1 mass % relative to the mass of the second layer 33.

The negative electrode 20 is produced in the following manner, for example. A first negative electrode mixture slurry for the first layer, which includes a negative electrode active material, a first binding agent, and the like, is prepared. The negative electrode active material contains a carbon material A and a Si-containing compound. The first binding agent contains PAA or a salt thereof. In addition, a second negative electrode mixture slurry for the second layer, which includes a negative electrode active material, a second binding agent, and the like, is prepared. The negative electrode active material contains a carbon material B. Subsequently, the first negative electrode mixture slurry is applied onto the negative electrode current collector 30, and then the applied layer is dried. Accordingly, the first layer 32 is formed on the negative electrode current collector 30. Next, the second negative electrode mixture slurry is applied onto the first layer 32, which has been formed on the negative electrode current collector 30, and then the applied layer is dried. Accordingly, the second layer 33 is formed on the first layer 32. The first layer 32 and the second layer 33 are then rolled. In this manner, the negative electrode 20 can be obtained. In the negative electrode 20, the negative electrode mixture layer 31, which includes the first layer 32 and the second layer 33, is formed on the negative electrode current collector 30.

<Nonaqueous Electrolyte>

The nonaqueous electrolyte includes a nonaqueous solvent and an electrolyte salt dissolved in the nonaqueous solvent. The nonaqueous electrolyte is not limited to a liquid electrolyte (nonaqueous electrolyte solution) and may be a solid electrolyte including a gel polymer or the like. Examples of the nonaqueous solvent include esters, such as ethylene carbonate (EC), propylene carbonate (PC), dimethyl carbonate (DMC), ethyl methyl carbonate (EMC), diethyl carbonate (DEC), and methyl propionate (MP); ethers; nitriles; amides; and mixed solvents of two or more of the foregoing compounds. The nonaqueous solvent may contain a halogen-substituted compound that corresponds to any of the above-mentioned solvents and in which at least one hydrogen atom is replaced with a halogen atom, such as a fluorine atom. Examples of the halogen-substituted compound include fluorinated cyclic carbonic acid esters, such as fluoroethylene carbonate (FEC); fluorinated chain carbonate esters; and fluorinated chain carboxylic acid esters, such as fluoromethyl propionate (FMP). It is preferable that the nonaqueous electrolyte contain fluoroethylene carbonate present in an amount greater than or equal to 15 mass %, from the standpoint of, for example, inhibiting degradation of the charge-discharge cycle characteristics of a nonaqueous electrolyte secondary battery or improving the input characteristics thereof. More preferably, the nonaqueous electrolyte contains fluoroethylene carbonate present within a range of 15 mass % to 25 mass %. Examples of the electrolyte salt include lithium salts, such as $LiBF_4$ and $LiPF_6$.

<Separator>

For the separator, a porous sheet having ion permeability and insulating properties is used, for example. Specific examples of the porous sheet include microporous membranes, woven fabrics, and nonwoven fabrics. Suitable materials for the separator include olefin-based resins, such as polyethylene, polypropylene, and copolymers including at least one of ethylene and propylene, and cellulose. The separator may be a layered structure including a cellulose fiber layer and a thermoplastic resin fiber layer. The thermoplastic resin may be an olefin-based resin, for example. Furthermore, the separator may be a multi-layer separator including a polyethylene layer and a polypropylene layer, for example. Furthermore, the separator may include an aramid-based resin or the like applied onto a surface thereof. Furthermore, a heat resistant layer including an inorganic filler may be formed on at least one of the interface between the separator and the positive electrode and the interface between the separator and the negative electrode.

EXAMPLES

The present invention will be further described below with reference to examples, but the present invention is not limited to the examples.

Example 1

[Positive Electrode]

94.8 parts by mass of a lithium transition metal oxide represented by $LiNi_{1/3}Co_{1/3}Mn_{1/3}O_2$, which was used as a positive electrode active material, 4 parts by mass of acetylene black (AB), and 1.2 parts by mass of polyvinylidene fluoride (PVDF) were mixed together, and then an appropriate amount of N-methyl-2-pyrrolidone (NMP) was added. Thus, a positive electrode mixture slurry was adjusted. Next, the positive electrode mixture slurry was applied to a positive electrode current collector, which was made of aluminum foil, except for a portion to which a lead was to be connected, and then the applied layer was dried. The applied layer was rolled by using a roller, and thereafter the resultant was cut to a predetermined electrode size. Thus, a positive electrode including positive electrode mixture layers formed on both sides of the positive electrode current collector was produced.

[Negative Electrode]

89 parts by mass of graphite A, 8 parts by mass of $SiO_x$ (x=0.94) having a carbon coating, 1 part by mass of a lithium salt of PAA, 1 part by mass of a sodium salt of CMC, and 1 part by mass of SBR were mixed together, and then an appropriate amount of water was added. The graphite A had a tap density of 0.92 $g/cm^3$ and a BET specific surface area of 4.2 $m^2/g$ and was used as a carbon material A. Thus, a first negative electrode mixture slurry for the first layer was adjusted. Furthermore, 97.5 parts by mass of graphite B1, 1.5 parts by mass of a sodium salt of CMC, and 1 part by mass of SBR were mixed together, and then an appropriate amount of water was added. The graphite B1 had a tap density of 1.14 $g/cm^3$ and a BET specific surface area of 6.1 $m^2/g$ and was used as a carbon material B. Thus, a second negative electrode mixture slurry for the second layer was prepared.

Next, the first negative electrode mixture slurry was applied to both sides of a negative electrode current collector, which was made of copper foil, except for a portion to which a lead was to be connected, and then the applied layers were dried. Thus, first layers were formed on both sides of the negative electrode current collector. Next, the second negative electrode mixture slurry was applied to the first layers formed on both sides of the negative electrode current collector, and then the applied layers were dried. Thus, second layers were formed. Subsequently, the applied layers were rolled by using a roller, and thereafter the resultant was cut to a predetermined electrode size. Thus, a negative electrode including negative electrode mixture layers formed on both sides of the negative electrode current collector was produced. Each of the negative electrode mixture layers included first and second layers. Masses and thicknesses of the first layers and the second layers of the negative electrode mixture layers were measured. The results were that the mass ratio of the second layer to the first layer was 1.0, and the thickness ratio of the second layer to the first layer was 1.34. That is, the mass of the first layers relative to the mass of the negative electrode mixture layers was 50 mass %, the mass of the second layers relative to the mass of the negative electrode mixture layers was 50 mass %, and the second layer had a lower packing density than the first layer. Note that the packing density of the negative electrode mixture layers was 1.65 $g/cm^3$.

[Nonaqueous Electrolyte]

Lithium hexafluorophosphate ($LiPF_6$) was added to a mixed solvent to a concentration of 1.0 mol/L. In the mixed solvent, ethylene carbonate (EC) and ethyl methyl carbonate (EMC) were mixed in a volume ratio of 3:7. Furthermore, 2 vol % (relative to the solvent) of vinylene carbonate was added. Thus, a nonaqueous electrolyte was prepared.

[Test Cell]

A lead was attached to the negative electrode and the positive electrode, and then the electrodes, with a separator disposed therebetween, were wound spirally. Thus, an electrode assembly having a wound structure was produced. The separator used was a single-layer separator made of polypropylene. The produced electrode assembly was inserted into a housing formed of an aluminum laminate sheet and was dried under vacuum at 105° C. for 2 hours and 30 minutes. Subsequently, the nonaqueous electrolyte was introduced into the housing, and then the opening of the housing was sealed. Thus, a test cell (laminate cell) was produced. The design capacity of the test cell was 880 mAh.

Example 2

A negative electrode was produced as in Example 1 except that a graphite B2 was used as a carbon material B in the preparation of the second negative electrode mixture slurry, and the amounts of application and thicknesses of the first layer and the second layer were changed. The graphite B2 had a tap density of 1.06 g/cm³ and a BET specific surface area of 4.4 m²/g. In the negative electrode mixture layer, the mass ratio of the second layer to the first layer was 0.5, and the thickness ratio of the second layer to the first layer was 0.62. That is, the mass of the first layers relative to the mass of the negative electrode mixture layers was 67 mass %, the mass of the second layers relative to the mass of the negative electrode mixture layers was 33 mass %, and the second layer had a lower packing density than the first layer. Note that the packing density of the negative electrode mixture layers was 1.70 g/cm³. A test cell was produced as in Example 1 except that the negative electrode just described was used.

Comparative Example

A negative electrode was produced as in Example 1 except that the production of the negative electrode was carried out as follows. 93 parts by mass of graphite A, 4 parts by mass of $SiO_x$ (x=0.94) having a carbon coating, 1 part by mass of a lithium salt of PAA, 1 part by mass of a sodium salt of CMC, and 1 part by mass of SBR were mixed together, and then an appropriate amount of water was added. Negative electrode mixture layers having a single-layer structure were formed from this negative electrode mixture slurry on both sides of a negative electrode current collector. Furthermore, a test cell was produced as in Example 1 except that the negative electrode just described was used.

[Evaluation of Capacity Retention Rate in Charge-Discharge Cycle]

In an environment at a temperature of 25° C., constant-current charging was performed at a constant current of 0.5 It until the cell voltage reached 4.2 V, and thereafter constant-voltage charging was performed at 4.2 V until the current value reached 1/50 It. Subsequently, constant-current discharging was performed at a constant current of 0.5 It until the cell voltage reached 2.5 V. This charge-discharge cycle was performed 50 times, and a capacity retention rate in the charge-discharge cycle was determined in accordance with the following equation. The results are shown in Table 1. In Table 1, the capacity retention rate of the test cell of Comparative Example 1 is the reference (1.0), and the capacity retention rates of Examples and Comparative Examples are values relative to the reference.

Capacity retention rate=(X2/X1)×100

X1: discharge capacity in 1st cycle
X2: discharge capacity in 50th cycle

[Evaluation of Input Characteristics]

In an environment at a temperature of 25° C., charging was performed at a constant current of 0.5 It until half of the initial capacity was reached. The charging was then stopped, and the cell was left to stand for 15 minutes. Subsequently, charging was performed at a current value of 0.1 It for 10 seconds, and thereafter the voltage was measured. Subsequently, discharging corresponding to the 10-second charged capacity was performed. At the next current value, charging was performed for 10 seconds, and thereafter the voltage was measured. Subsequently, discharging corresponding to the 10-second charged capacity was performed. This operation was repeated from a current value of 0.1 It to a current value of 2 It. From the measured voltage values, the current value at which 4.2 V was achieved with 10-second charging was calculated. Accordingly, a necessary power (input characteristics) of the instance was determined. The results are shown in Table 1. In Table 1, the necessary power of the test cell of Comparative Example 1 is the reference (1.0), and the necessary powers of Examples and Comparative Examples are values relative to the reference. Values greater than 1.0 indicate improved input characteristics.

TABLE 1

| | Negative electrode mixture layer | Weight ratio of second layer to first layer | Thickness ratio of second layer to first layer | Necessary power (input characteristics) | Capacity retention rate |
|---|---|---|---|---|---|
| Example 1 | Second layer: graphite B1/CMC/SBR First layer: graphite A/$SiO_x$/PAA/CMC/SBR | 1.00 | 1.34 | 1.12 | 1.00 |
| Example 2 | Second layer: graphite B2/CMC/SBR First layer: graphite A/$SiO_x$/PAA/CMC/SBR | 0.50 | 0.62 | 1.11 | 1.00 |
| Comparative Example 1 | Single layer: graphite A/$SiO_x$/PAA/CMC/SBR | — | — | 1.00 | 1.00 |

Each of the negative electrode mixture layers of Examples 1 and 2 included a first layer and a second layer. The first layer was formed on a negative electrode current collector and included a negative electrode active material and a first binding agent. The negative electrode active material in the first layer included a carbon material A and a Si-containing compound. The first binding agent included polyacrylic acid or a salt thereof. The second layer was formed on the first layer and included a negative electrode active material and a second binding agent. The negative electrode active material in the second layer included a carbon material B. The carbon material B had a tap density higher than a tap density of the carbon material A. A mass of the first layer relative to a mass of the negative electrode mixture layer was 50 mass % or greater and less than 90 mass %. A mass of the second layer relative to the mass of the negative electrode mixture layer was greater than 10 mass % and 50 mass % or less. A packing density of the second layer was lower than a packing density of the first layer. The negative electrode mixture layer of Comparative Example 1 had a single-layer structure that included a carbon material, a Si-containing compound, and a salt of polyacrylic acid. In a comparison of Examples 1 and 2 with Comparative Example 1, both Examples 1 and 2 demonstrated a higher necessary power than Comparative Example 1 and, therefore, had improved input characteristics. Furthermore, both Examples 1 and 2 demonstrated a capacity retention rate comparable to the capacity retention rate of Comparative Example 1, which demonstrated that degradation of charge-discharge cycle characteristics was inhibited.

REFERENCE SIGNS LIST

10 Nonaqueous electrolyte secondary battery
11 Electrode assembly
12 Positive electrode terminal
13 Negative electrode terminal
14 Battery case
15 Case body
16 Sealing member
17 Insulating member
20 Negative electrode
30 Negative electrode current collector
31 Negative electrode mixture layer
32 First layer
33 Second layer

The invention claimed is:

1. A negative electrode for a nonaqueous electrolyte secondary battery, the negative electrode comprising a negative electrode current collector and a negative electrode mixture layer formed on the negative electrode current collector,
   the negative electrode mixture layer including
   a first layer formed on the negative electrode current collector and including a negative electrode active material and a first binding agent, the negative electrode active material, which is in the first layer, including a carbon material A and a Si-containing compound, the first binding agent including polyacrylic acid or a salt thereof, and
   a second layer formed on the first layer and including a negative electrode active material and a second binding agent, the negative electrode active material, which is in the second layer, including a carbon material B, the carbon material B having a tap density higher than a tap density of the carbon material A, wherein
   a mass of the first layer relative to a mass of the negative electrode mixture layer is 50 mass % or greater and less than 90 mass %, and a mass of the second layer relative to the mass of the negative electrode mixture layer is greater than 10 mass % and 50 mass % or less,
   a packing density of the second layer is lower than a packing density of the first layer,
   a mass ratio between the carbon material A and the Si-containing compound in the first layer is within a range of 95:5 to 70:30, and
   a concentration of the first binding agent in the first layer is higher than a concentration of the second binding agent in the second layer.

2. The negative electrode for a nonaqueous electrolyte secondary battery according to claim 1, wherein the carbon material B has a BET specific surface area higher than a BET specific surface area of the carbon material A.

3. The negative electrode for a nonaqueous electrolyte secondary battery according to claim 1, wherein a BET specific surface area of the carbon material A is within a range of 0.9 $m^2/g$ to 4.5 $m^2/g$, and a BET specific surface area of the carbon material B is within a range of 4.0 $m^2/g$ to 8.0 $m^2/g$.

4. The negative electrode for a nonaqueous electrolyte secondary battery according to claim 1, wherein the tap density of the carbon material A is within a range of 0.85 $g/cm^3$ to 1.00 $g/cm^3$.

5. The negative electrode for a nonaqueous electrolyte secondary battery according to claim 1, wherein the tap density of the carbon material B is within a range of 1.00 $g/cm^3$ to 1.25 $g/cm^3$.

6. The negative electrode for a nonaqueous electrolyte secondary battery according to claim 1, wherein a packing density of the negative electrode mixture layer is greater than or equal to 1.65 $g/cm^3$.

7. A nonaqueous electrolyte secondary battery comprising: the negative electrode for a nonaqueous electrolyte secondary battery according to claim 1; a positive electrode; and a nonaqueous electrolyte.

8. The nonaqueous electrolyte secondary battery according to claim 7, wherein fluoroethylene carbonate is present in an amount greater than or equal to 15 mass % in the nonaqueous electrolyte.

9. The negative electrode for a nonaqueous electrolyte secondary battery according to claim 1, wherein the second layer contains substantially no polyacrylic acid or salt thereof.

* * * * *